(12) United States Patent
Yoneyama

(10) Patent No.: US 8,873,159 B2
(45) Date of Patent: Oct. 28, 2014

(54) TELEPHOTO LENS SYSTEM

(75) Inventor: Shuji Yoneyama, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 13/600,632

(22) Filed: Aug. 31, 2012

(65) Prior Publication Data

US 2013/0155527 A1  Jun. 20, 2013

(30) Foreign Application Priority Data

Dec. 16, 2011 (KR) .................. 10-2011-0136567

(51) Int. Cl.
*G02B 15/14* (2006.01)
*G02B 13/02* (2006.01)

(52) U.S. Cl.
USPC ........... 359/684; 359/685; 359/690; 359/716; 359/740; 359/745; 359/748; 359/785

(58) Field of Classification Search
USPC ......... 359/683–685, 690, 716, 740, 745, 748, 359/785
See application file for complete search history.

(56) References Cited

U.S. PATENT DOCUMENTS

| | | | |
|---|---|---|---|
| 4,176,913 A * | 12/1979 | Nakamura et al. | ............ 359/746 |
| 4,852,984 A | 8/1989 | Takahashi et al. | |
| 2005/0248857 A1 | 11/2005 | Wada | |
| 2009/0262439 A1 | 10/2009 | Yoneyama | |
| 2010/0231781 A1 | 9/2010 | Lee | |
| 2010/0321782 A1 | 12/2010 | Yasui | |
| 2012/0057250 A1 | 3/2012 | Yoneyama | |

FOREIGN PATENT DOCUMENTS

| | | |
|---|---|---|
| JP | 59-048723 A | 3/1984 |
| JP | 07-199066 A | 8/1995 |
| JP | 08-129132 A | 5/1996 |
| JP | 2915985 B2 | 7/1999 |
| JP | 3021890 B2 | 3/2000 |
| JP | 2000-347099 A | 12/2000 |
| JP | 2002-131640 A | 5/2002 |
| JP | 3445554 B2 | 9/2003 |
| KR | 10-2009-0111221 A | 10/2009 |
| KR | 1020090111221 A | 10/2009 |
| KR | 10-2010-0103292 A | 9/2010 |
| KR | 10-2012-0025879 A | 3/2012 |

OTHER PUBLICATIONS

Search Report established for PCT/KR2012/010484 (Feb. 26, 2013).
Search Report established for EP 12188174.2 (Feb. 26, 2013).

* cited by examiner

*Primary Examiner* — Evelyn A. Lester
(74) *Attorney, Agent, or Firm* — Drinker Biddle & Reath LLP

(57) ABSTRACT

A telephoto lens system includes a first lens group having a positive refractive power, and comprising at least three positive lenses and one negative lens; a second lens group having a negative refractive power, and which moves along an optical axis to perform a focusing operation; a third lens group having a positive refractive power, and comprising a cemented lens in which a positive lens having a convex surface toward the object side and a positive lens having a convex surface toward the image side are bonded to each other, a bi-convex positive lens, and a negative lens having a concave surface toward the object side, and the first through third lens groups are disposed sequentially from the object side to the image side.

8 Claims, 12 Drawing Sheets

(when focused on object at ∞)

(when focused on near object)

( when focused on object at ∞ )

( when focused on near object )

( when focused on object at ∞ )

( when focused on near object )

TELEPHOTO LENS SYSTEM

CROSS-REFERENCE TO RELATED PATENT APPLICATION

This application claims the benefit of Korean Patent Application No. 10-2011-0136567, filed on Dec. 16, 2011, in the Korean Intellectual Property Office, the disclosure of which is incorporated herein in its entirety by reference.

BACKGROUND

1. Field of the Invention

The invention relates to a photographing lens used in an electronic still camera or a digital video camera, and more particularly, to a bright telephoto lens system having an inner focus type.

2. Description of the Related Art

Recently, digital cameras or digital camcorders that use an image sensing device such as a charge coupled device (CCD) or a complementary metal-oxide semiconductor (CMOS) have been widely distributed.

In video cameras or digital cameras, a telephoto lens that is bright and has a small F number is preferred. However, a bright telephoto lens is big and heavy, and thus the focusing speed may be slow in a camera having an auto-focusing function.

To address the above problem, many focusing methods have been suggested; however, these may not provide a lens which is both bright and light weight. For example, there has been suggested a bright telephoto lens having an F number of 1.4 and the number of lenses in a focusing lens group is five; however, the telephoto lens is not light weight because there are too many lenses in the focus lens group. On the other hand, when the number of lenses in the focus lens group may be one or two in order to achieve the light weight, this provides a lens with an F number of about 2, which is not satisfactory in terms of brightness. Also, there is an example where the number of lenses in the focus lens group is two and the F number is 1.8; however, such a lens also needs a large aperture.

With respect to these demands, a design for a telephoto lens system applied to a single lens reflex (SLR) type camera has been suggested. For example, a back focus is designed to be long to accommodate a space for a mirror attracting light to an optical finder. Also, a design for a telephoto lens system that does not need a long back focus by using an electronic view finder instead of using the optical finder has been suggested recently.

SUMMARY

An embodiment of the invention provides a telephoto lens system having a large aperture and an inner focus type, with a wide-angle structure.

According to an embodiment, there is provided a telephoto lens system including: a first lens group having a positive refractive power, and including at least three positive lenses and one negative lens; a second lens group having a negative refractive power, which moves along the optical axis to perform a focusing operation; a third lens group having a positive refractive power, which includes a cemented lens in which a negative lens having a concave surface toward the object side and a positive lens having a convex surface toward the image side are bonded to each other, a bi-convex positive lens, and a negative lens having a concave surface toward the object side, wherein the first through third lens groups are disposed sequentially from the object side toward the image side.

The telephoto lens system may satisfy the following inequality $$-1.2 < f/f3n < -0.7,$$

where f denotes the overall focal length, and f3n denotes the focal length of a negative lens that is the closest to the image side in the third lens group.

The telephoto lens system may satisfy the following inequality $$0.6 < (r3n2+r3n1)/(r3n2-r3n1) < 1.4,$$

where r3n1 and r3n2 respectively denote the radius of curvature of the object side surface and the image side surface of the negative lens that is the closest to the image side in the third lens group.

The telephoto lens system may satisfy the following inequality $$-6.0 < (r3n1+r3p)/(r3n1-r3p) < -1.5,$$

where r3n1 denotes the radius of curvature of the object side surface of the negative lens that is the closest to the image side in the third lens group, and r3p denotes the radius of curvature of the image side surface of a positive lens that is adjacent to the negative lens closest to the image side in the third lens group.

The telephoto lens system may satisfy the following inequality $$1.52 < N3n < 1.70,$$

where N3n denotes the refractive index of the negative lens that is closest to the image side in the third lens group.

The telephoto lens system may further include an aperture stop disposed on the object side of the third lens group.

The first lens group may include a positive lens, a positive lens formed as a meniscus, a bi-concave negative lens, and a positive lens that are arranged sequentially from the object side to the image side.

The telephoto lens system may satisfy the following inequality $$-0.4 < (r1p2+r1p1)/(r1p2-r1p1) < -0.1,$$

where r1p1 and r1p2 respectively denote the radius of curvature of the object side surface and the image side surface of the positive lens that is closest to the object side in the first lens group.

BRIEF DESCRIPTION OF THE DRAWINGS

The above and other features and advantages will become more apparent by the following detailed description of exemplary embodiments thereof with reference to the attached drawings in which.

DETAILED DESCRIPTION

Figure 1:
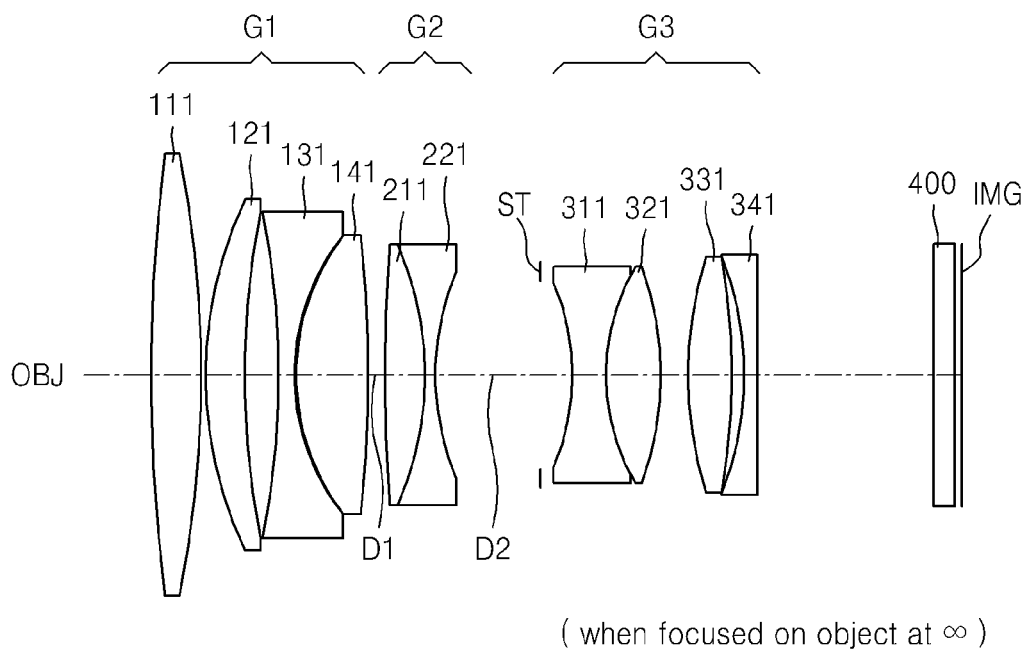
FIG. 1 is a diagram showing an optical arrangement of a telephoto lens system according to an embodiment, when the lens is focused on an object that is located far from the lens (i.e., at infinity), and when the lens is focused on an object located close to the lens (i.e., at a minimum focusing distance)
Figure 1:
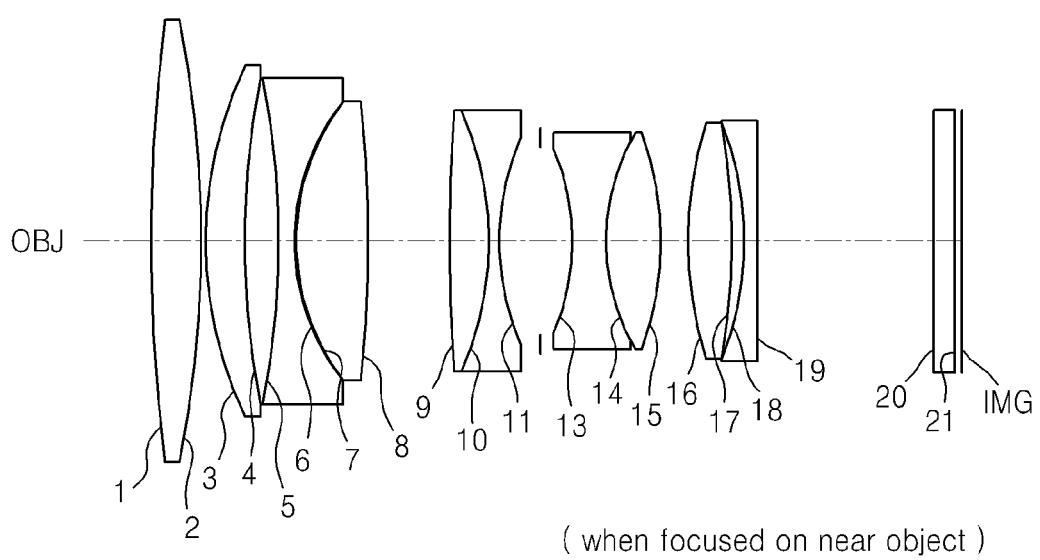

Embodiments will now be described more fully with reference to the accompanying drawings. In the drawings, the thicknesses of layers and regions may be exaggerated for clarity.

Figure 3:
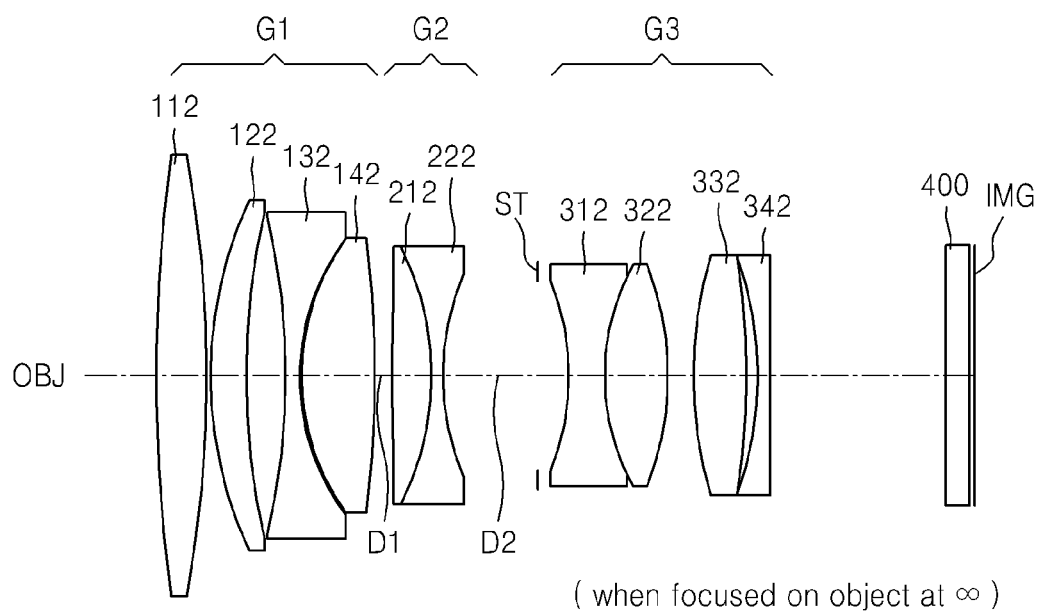
FIG. 3 is a diagram showing an optical arrangement of a telephoto lens system according to another embodiment, when the lens is focused on an object that is located far from the lens (i.e., at infinity), and when the lens is focused on an object located close to the lens (i.e., at a minimum focusing distance)
Figure 3:
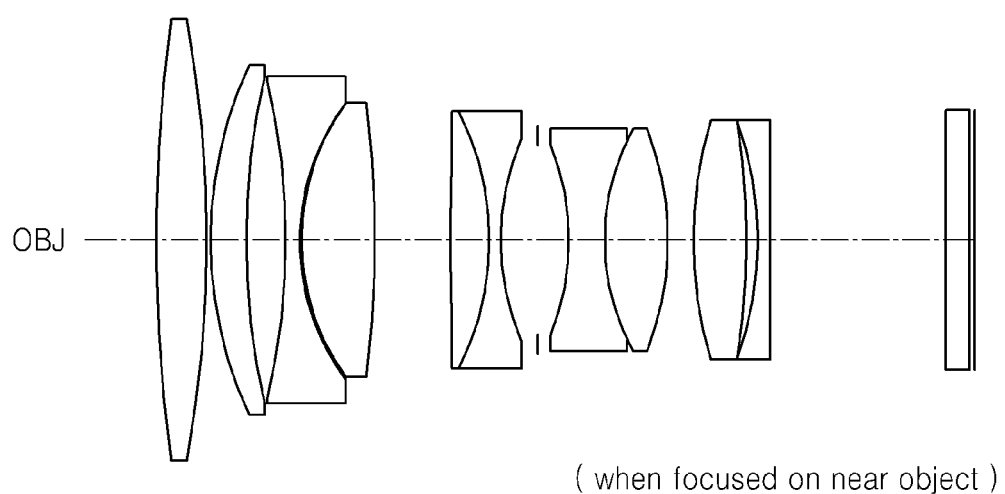
Figure 5:
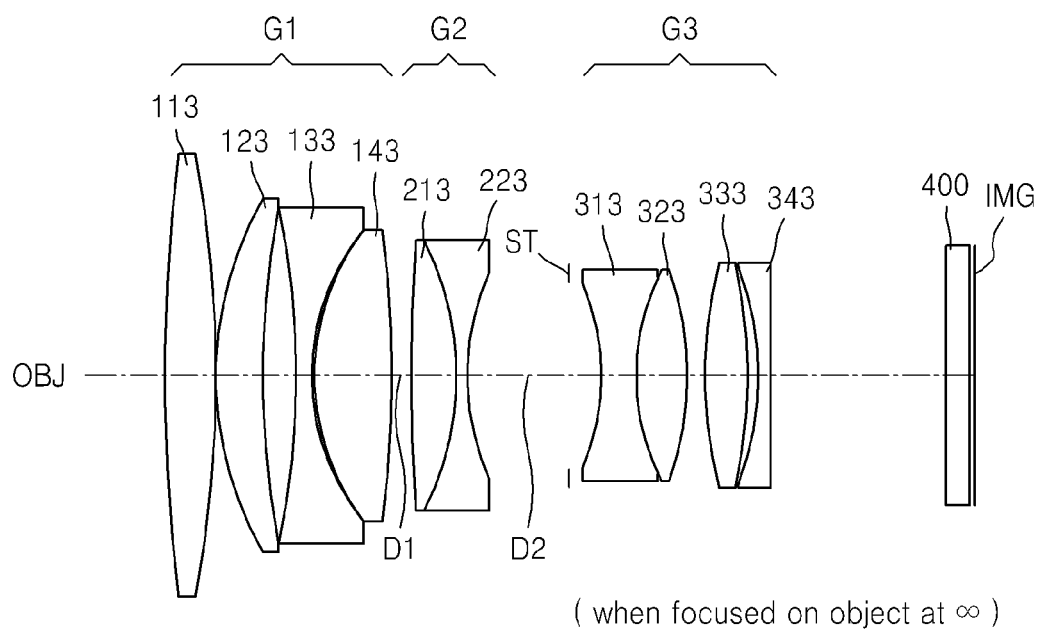
FIG. 5 is a diagram showing an optical arrangement of a telephoto lens system according to another embodiment, when the lens is focused on an object that is located far from the lens (i.e., at infinity), and when the lens is focused on an object located close to the lens (i.e., at a minimum focusing distance)
Figure 5:
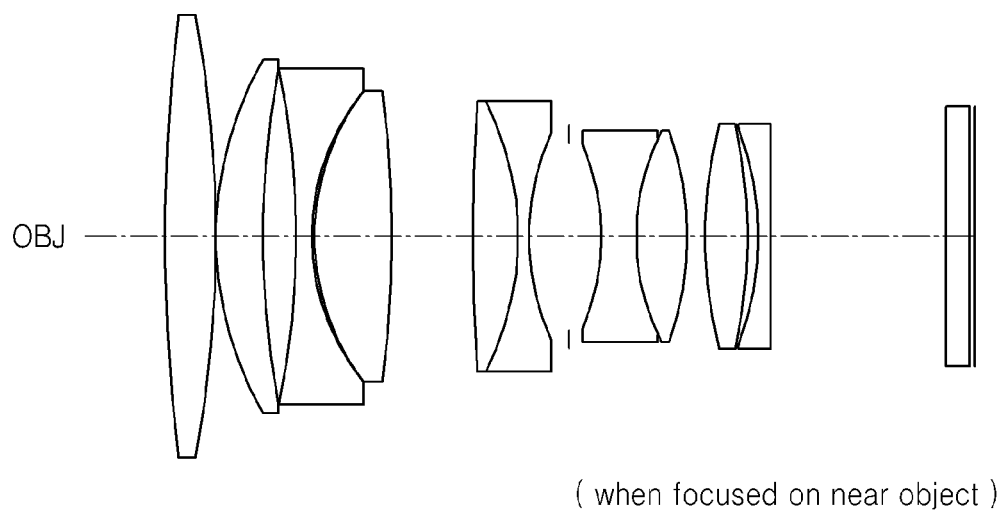

FIGS. 1, 3, and 5 show optical arrangements of telephoto lens systems according to various embodiments, when the lens is focused on an object that is located far from the lens (i.e., at infinity), and when the lens is focused on an object located close to the lens (i.e., at a minimum focusing distance).

The embodiments provide an inner focus type telephoto lens system that is bright with a wide-angle. In the telephoto lens system according to the embodiments, lenses are sequentially arranged from an object OBJ side to an image IMG side, and the telephoto lens system includes a first lens group G1 having a positive refractive power, a second lens group G2 having a negative refractive power and which moves along an optical axis to perform a focusing operation, and a third lens group G3 having a positive refractive power.

The first lens group G1 includes at least three positive lenses and one negative lens, more specifically, includes a positive lens, a meniscus type positive lens, a negative lens, and a positive lens from the object side toward the image side.

The second lens group G2 includes a cemented lens in which a positive lens and a negative lens are bonded to each other.

The third lens group G3 includes a cemented lens, in which a negative lens having a concave surface toward the object and a positive lens having a convex surface toward the object are bonded to each other, a bi-convex positive lens, and a negative lens having a concave surface toward the object arranged from the object side toward the image side.

An aperture stop ST is disposed on the object side of the third lens group G3.

The telephoto lens system according to an embodiment satisfies the following inequality.

$$-1.2 < f/f3n < -0.7 \quad (1)$$

where f denotes the total focal length, and f3n denotes the focal length of the negative lens that is closest to the image side in the third lens group G3.

The above inequality (1) is relates to refractive power of the negative lens located at the image side in the third lens group G3. When the negative refractive power falls below the lowest limit of the above inequality (1), Petzval sum becomes less and an excessive compensation is required, and a positive field curvature is obtained. When the negative refractive power exceeds the highest limit, the Petzval sum becomes greater, and an effect of compensating the negative field curvature according to a wide-angle is reduced. Also, when the negative refractive power is reduced, the telephoto effect is reduced, and then, an overall length of the lens system has to increase.

In addition, the telephoto lens system according to the present embodiment may satisfy following inequality.

$$0.6 < (r3n2 + r3n1)/(r3n2 - r3n1) < 1.4 \quad (2)$$

where r3n1 and r3n2 respectively denote the radius of curvature of the object side surface and the image side surface of the negative lens that is located closest to the image side in the third lens group G3.

The above inequality (2) relates to the shape of the negative lens that is closest to the image side in the third lens group G3. Under the lowest limit of the above inequality (2), the negative lens becomes bi-concave lens and an angle of the light incident from the image side surface becomes greater, and thus a coma aberration or a tangential field curvature occurs. In addition, a tool (not shown) for fixing the lens may protrude toward the image from the lens surface, and thus the overall length of the lens system including the tool may be increased. Above the highest limit of the inequality, the negative lens becomes a meniscus shape, and the field curvature becomes greater, and thus the coma aberration or the tangential field curvature may not be appropriately corrected.

Also, the telephoto lens system may satisfy the following inequality.

$$-6.0 < (r3n1 + r3p)/(r3n1 - r3p) < -1.5 \quad (3)$$

where r3n1 denotes the radius of curvature of the object side surface of the negative lens that is the closest to the image side in the third lens group G3, and r3p denotes the radius of curvature of an image side surface of the positive lens that is adjacent to the object side surface of the negative lens that is the closest to the image side in the third lens group G3.

The inequality (3) relates to the shape of a space between the object side surface 18 of the negative lens that is the closest to the image side and the image side surface 17 of the positive lens that is disposed at an object side of the negative lens in the third lens group G3.

The shape of the space is formed as a meniscus that is concave toward the object side. Under the lowest limit of the inequality, the radius of curvatures of the two surfaces 17 and 18 are reduced, resulting in greater spherical aberration. In addition, the shape of the image side surface of the negative lens that is the closest to the image side in the third lens group G3 required by the inequalities (1) and (2) may not be maintained. Above the highest limit of the inequality, the radius of curvatures of the two surfaces 17 and 18 are increased, and the spherical aberration may not be corrected. In addition, the shape of the negative lens required by the above inequalities (1) and (2) may not be maintained.

Also, the telephoto lens system may satisfy the following inequality.

$$1.52 < N3n < 1.70 \quad (4)$$

where N3n is the refractive power of the negative lens that is the closest to the image side in the third lens group G3.

The inequality (4) controls the Petzval sum together with the inequality (1). Under the lowest limit of the inequality (4), the refractive power is reduced, and the Petzval sum is changed in a negative direction and the field curvature increases in a positive direction. Above the highest limit of the inequality (4), the refractive power is increased, and then the Petzval sum is changed in the positive direction and the field curvature is increased in the negative direction.

In addition, the positive lens that is closest to the object side in the first lens group G1 of the telephoto lens system may satisfy the following inequality.

$$-0.4 < (r1p2 + r1p1)/(r1p2 - r1p1) < -0.1 \quad (5)$$

where r1p1 is the radius of curvature of the object side surface of the positive lens that is closest to the object side in the first lens group G1, and r1p2 denotes the radius of curvature of the image side surface of the positive lens that is closest to the object side in the first lens group G1.

The above inequality (5) relates to the shape of the positive lens that is closest to the object side in the first lens group G1. In general, in the optical system that is bright about F 1.4, the first surface of the lens system generally has a relatively strong positive refractive power in order to correct the spherical aberration. However, in the present embodiment, the above inequality is suggested in order to prevent aberration from occurring due to the wide viewing angle.

Under the lowest limit of the above inequality (5), the radius of curvature of the object side surface is increased, and the spherical aberration becomes worse, and the aberration of the entire lens system may not be maintained.

Above the highest limit of the inequality (5), the spherical aberration is reduced; however, an incident angle of a flux out of the optical axis incident on the image side surface is increased, and the coma aberration or the tangential field curvature occurs and the aberration of the lens system may not appropriately maintained.

Hereinafter, detailed lens structure and lens data in each of the lens groups will be described according to embodiments. In the lens data, ST denotes an aperture stop, EFL denotes an entire focal length, Fno denotes F number, and FOV denotes a viewing angle. RDY, THI, Nd, and Vd respectively denote a radius of curvature, a lens thickness or a distance between lenses, a refractive index, and Abbe number, D1 and D2 denote variable distance according to focusing and Pos1, Pos2, Pos3 denotes variable positions.

First Embodiment

FIG. 1 shows optical arrangements in the telephoto system according to an embodiment, when the lens is focused on an object that is located far from the lens (i.e., at infinity), and when the lens is focused on an object located close to the lens (i.e., at a minimum focusing distance). The telephoto system includes the first lens group G1 having a positive refractive power, the second lens group G2 having a negative refractive power, and the third lens group G3 having a positive refractive power. The first lens group G1 includes a first lens 111 that is a positive lens, a second lens 121 that is a positive lens, a third lens 131 that is a negative lens, and a fourth lens 141 that is a positive lens. The second lens group G2 includes a fifth lens 211 that is a positive lens and a sixth lens 221 that is a negative lens. The fifth lens 211 and the sixth lens 221 form a cemented lens by bonding to each other. The third lens group G3 includes a seventh lens 311 that is a negative lens, an eighth lens 321 that is a positive lens, a ninth lens 331 that is a positive lens, and a tenth lens 341 that is a negative lens. The seventh lens 311 and the eighth lens 321 form a cemented lens by bonding to each other.

The lens data is as follows.

| EFL = 51.89 | | | | |
|---|---|---|---|---|
| Fno = 1.44 | | | | |
| FOV = 30.98° | | | | |
| Surface | RDY | THI | Nd | Vd |
| 1 | 209.731 | 5.49 | 1.77250 | 49.6 |
| 2 | −116.465 | 0.33 | | |
| 3 | 43.335 | 4.34 | 1.77250 | 49.6 |
| 4 | 96.839 | 3.82 | | |
| 5 | −88.655 | 1.70 | 1.74077 | 27.8 |
| 6 | 24.344 | 0.14 | | |
| 7 | 24.771 | 7.88 | 1.88300 | 40.8 |
| 8 | −153.225 | D1 | | |
| 9 | 301.299 | 4.42 | 1.84666 | 23.8 |
| 10 | −31.575 | 1.20 | 1.83481 | 42.7 |
| 11 | 31.575 | D2 | | |
| ST | Infinity | 3.42 | | |
| 13 | −26.829 | 4.00 | 1.76182 | 26.6 |
| 14 | 24.609 | 5.90 | 1.88300 | 40.8 |
| 15 | −33.219 | 2.98 | | |
| 16 | 43.349 | 4.72 | 1.88300 | 40.8 |
| 17 | −76.762 | 1.45 | | |
| 18 | −34.953 | 1.40 | 1.56732 | 42.8 |
| 19 | −2722.121 | 19.18 | | |
| 20 | Infinity | 2.80 | 1.51680 | 64.2 |
| 21 | Infinity | 0.50 | | |
| 22 | Infinity | 0.00 | | |

TABLE 1

| | Pos1 | Pos2 | Pos3 |
|---|---|---|---|
| Magnification | 0.0000 | 1/30 | 0.153 |
| Object location | INF. | 1578.52 | 361.018 |
| D1 | 2.0 | 3.052 | 9.254 |
| D2 | 11.309 | 9.807 | 4.056 |

Figure 2A:
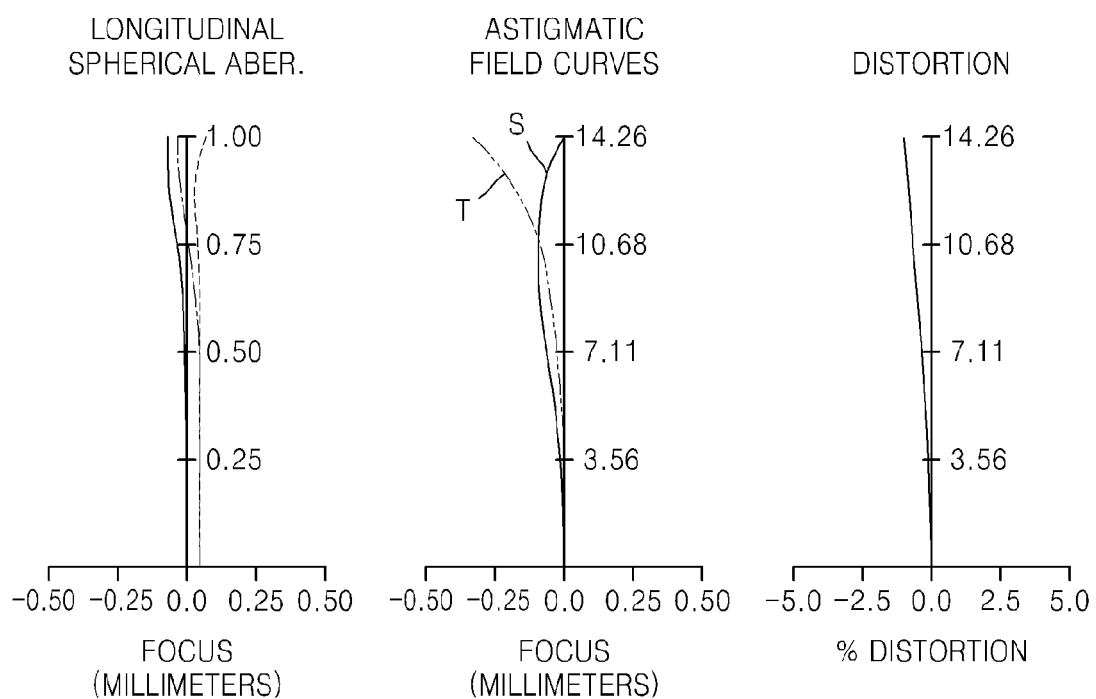
FIGS. 2A, 2B, and 2C are diagrams showing spherical aberration, field curvature, and distortion of the telephoto lens system of FIG. 1 when focused on an object located at an infinite (i.e., far away) location, on a medium location, and on a shortest location, respectively.
Figure 2B:
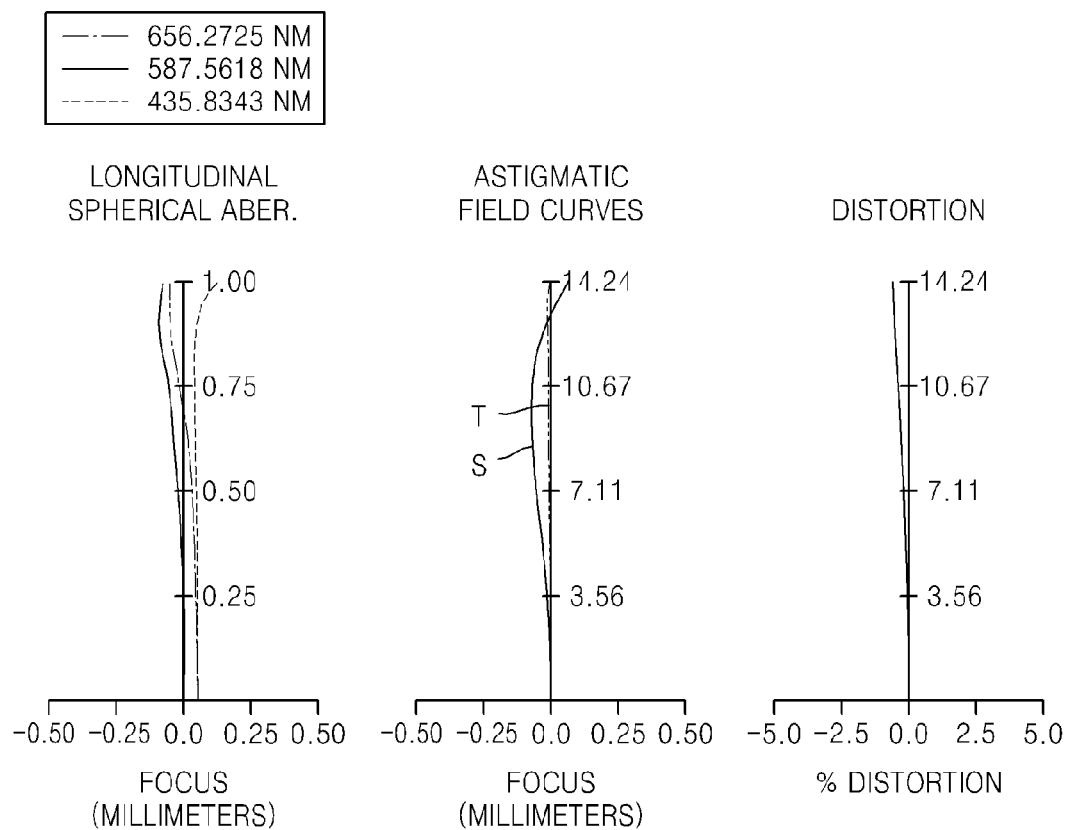
Figure 2C:
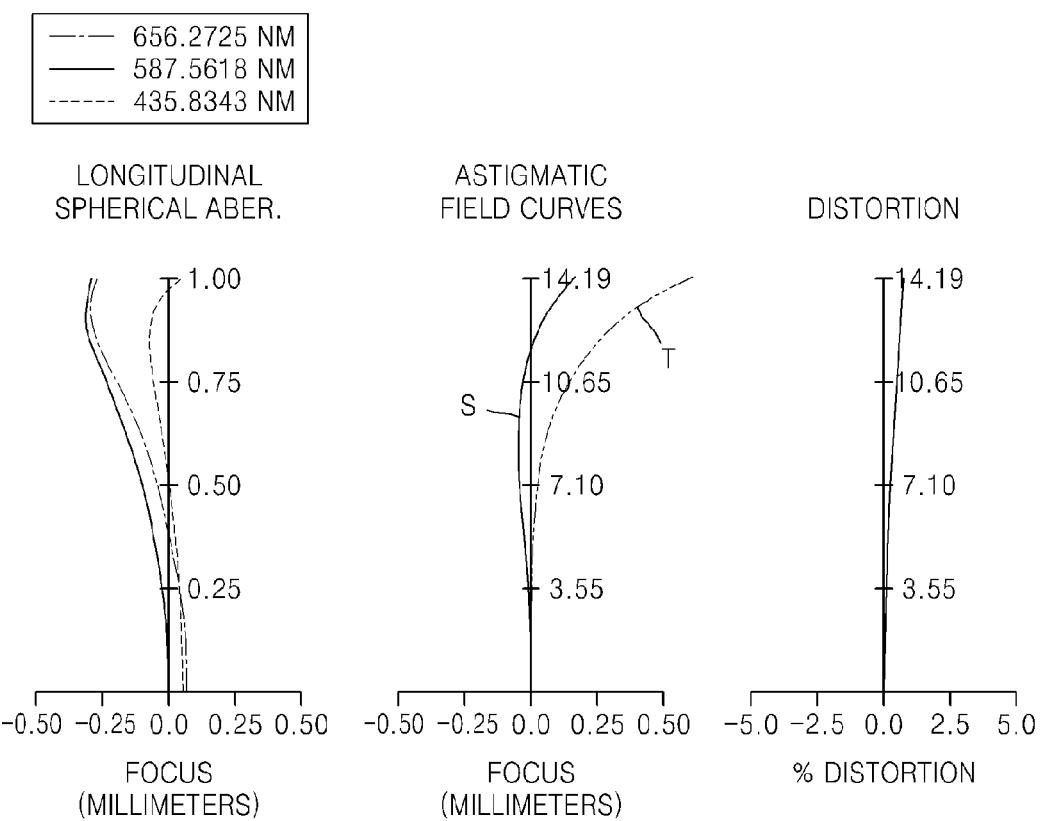

FIGS. 2A, 2B, and 2C are aberration diagrams showing a longitudinal spherical aberration, astigmatic field curvatures, and distortions when the object is located at positions Pos1, Pos2, and Pos3 in the telephoto lens system of FIG. 1.

The spherical aberration is shown with respect to light beams having a wavelength of 656.2725 nm, a wavelength of 587.5618 nm, and a wavelength of 435.8343 nm, and the astigmatic field curvature and the distortion are shown with respect to light having a wavelength of 587.5618 nm. T and S respectively denote curvatures on a tangential surface and a sagittal surface.

Second Embodiment

FIG. 3 shows optical arrangements in the telephoto system according to another embodiment, when the lens is focused on an object that is located far from the lens (i.e., at infinity), and when the lens is focused on an object located close to the lens (i.e., at a minimum focusing distance). The telephoto system includes the first lens group G1 having a positive refractive power, the second lens group G2 having a negative refractive power, and the third lens group G3 having a positive refractive power. The first lens group G1 includes a first lens 112 that is a positive lens, a second lens 122 that is a positive lens, a third lens 132 that is a negative lens, and a fourth lens 142 that is a positive lens. The second lens group G2 includes a fifth lens 212 that is a positive lens and a sixth lens 222 that is a negative lens. The fifth lens 212 and the sixth lens 222 form a cemented lens by bonding to each other. The third lens group G3 includes a seventh lens 312 that is a negative lens, an eighth lens 322 that is a positive lens, a ninth lens 332 that is a positive lens, and a tenth lens 342 that is a negative lens. The seventh lens 312 and the eighth lens 322 form a cemented lens by bonding to each other.

The lens data is as follows.

| EFL = 51.84 Fno = 1.44 FOV = 31.00° | | | | |
|---|---|---|---|---|
| surface | RDY | THI | Nd | Vd |
| 1 | 180.683 | 5.69 | 1.80420 | 46.5 |
| 2 | −119.113 | 0.10 | | |
| 3 | 42.434 | 4.35 | 1.77250 | 49.6 |
| 4 | 93.419 | 3.96 | | |
| 5 | −80.423 | 1.70 | 1.75520 | 27.5 |
| 6 | 24.950 | 0.15 | | |
| 7 | 25.468 | 7.93 | 1.88300 | 40.8 |
| 8 | −113.724 | D1 | | |
| 9 | 511.804 | 4.39 | 1.84666 | 23.8 |
| 10 | −29.780 | 1.20 | 1.83481 | 42.7 |
| 11 | 29.780 | D2 | | |
| ST | Infinity | 3.32 | | |
| 13 | −28.408 | 4.00 | 1.76182 | 26.6 |
| 14 | 25.172 | 6.75 | 1.88300 | 40.8 |
| 15 | −34.540 | 2.96 | | |
| 16 | 43.014 | 5.81 | 1.88300 | 40.8 |
| 17 | −73.337 | 1.27 | | |
| 18 | −37.293 | 1.40 | 1.60342 | 38.0 |
| 19 | Infinity | 19.18 | | |
| 20 | Infinity | 2.80 | 1.51680 | 64.2 (Filter) |
| 21 | Infinity | 0.50 | 1.00000 | 0.0 |
| 22 | Infinity | 0.00 | | |

TABLE 2

| | Pos1 | Pos2 | Pos3 |
|---|---|---|---|
| Magnification | 0.0000 | 1/30 | 0.153 |
| Object location | INF. | 1578.52 | 360.018 |
| D1 | 2.0 | 3.341 | 8.443 |
| D2 | 10.536 | 9.195 | 4.093 |

Figure 4A:
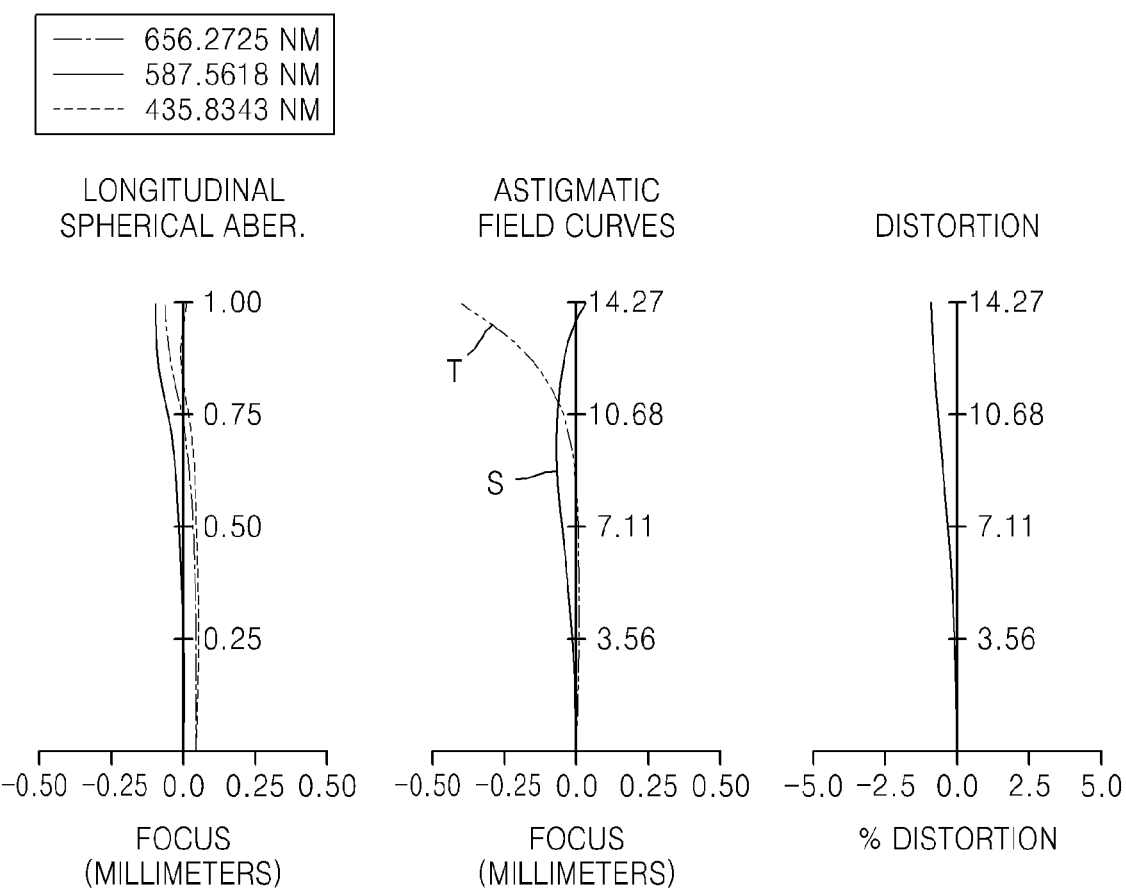
FIGS. 4A, 4B, and 4C are diagrams showing spherical aberration, field curvature, and distortion of the telephoto lens system of FIG. 3 when focused on an object located at an infinite (i.e., far away) location, at a medium location, and at a shortest location.
Figure 4B:
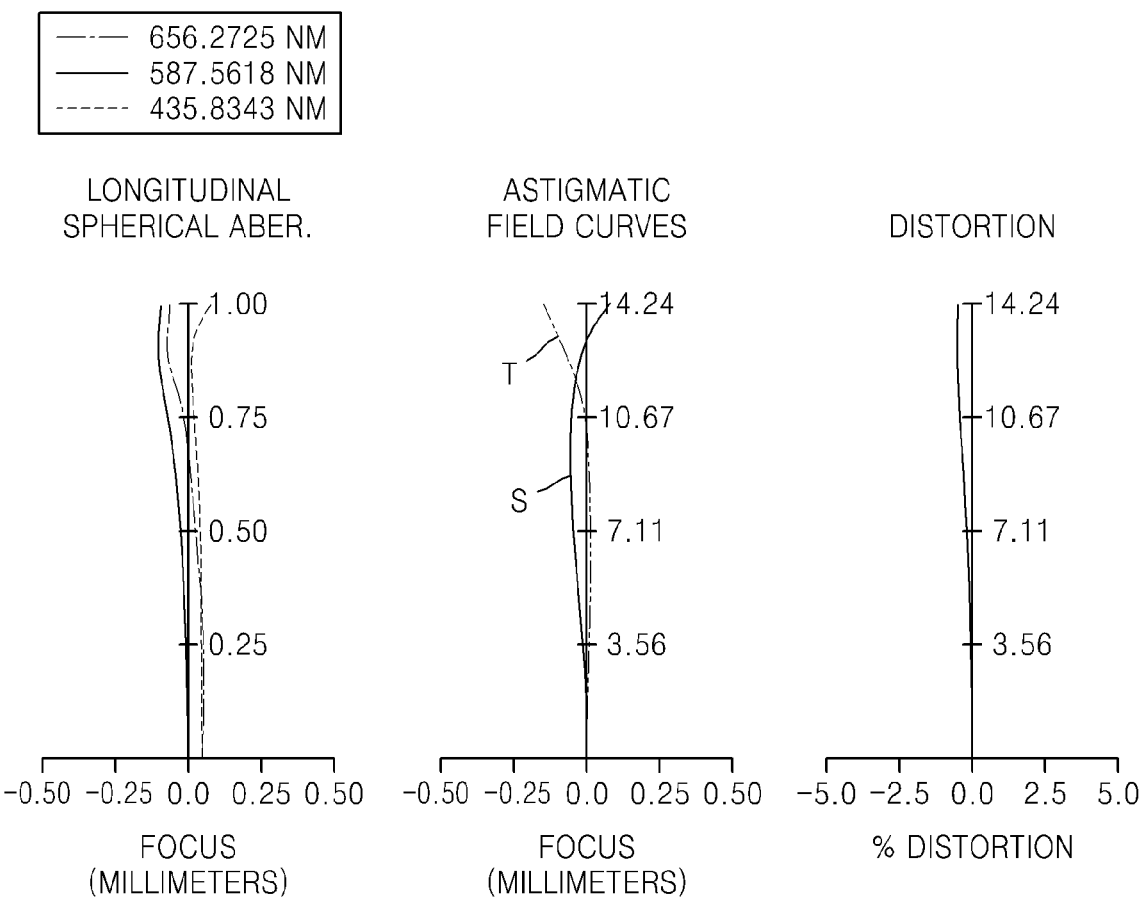
Figure 4C:
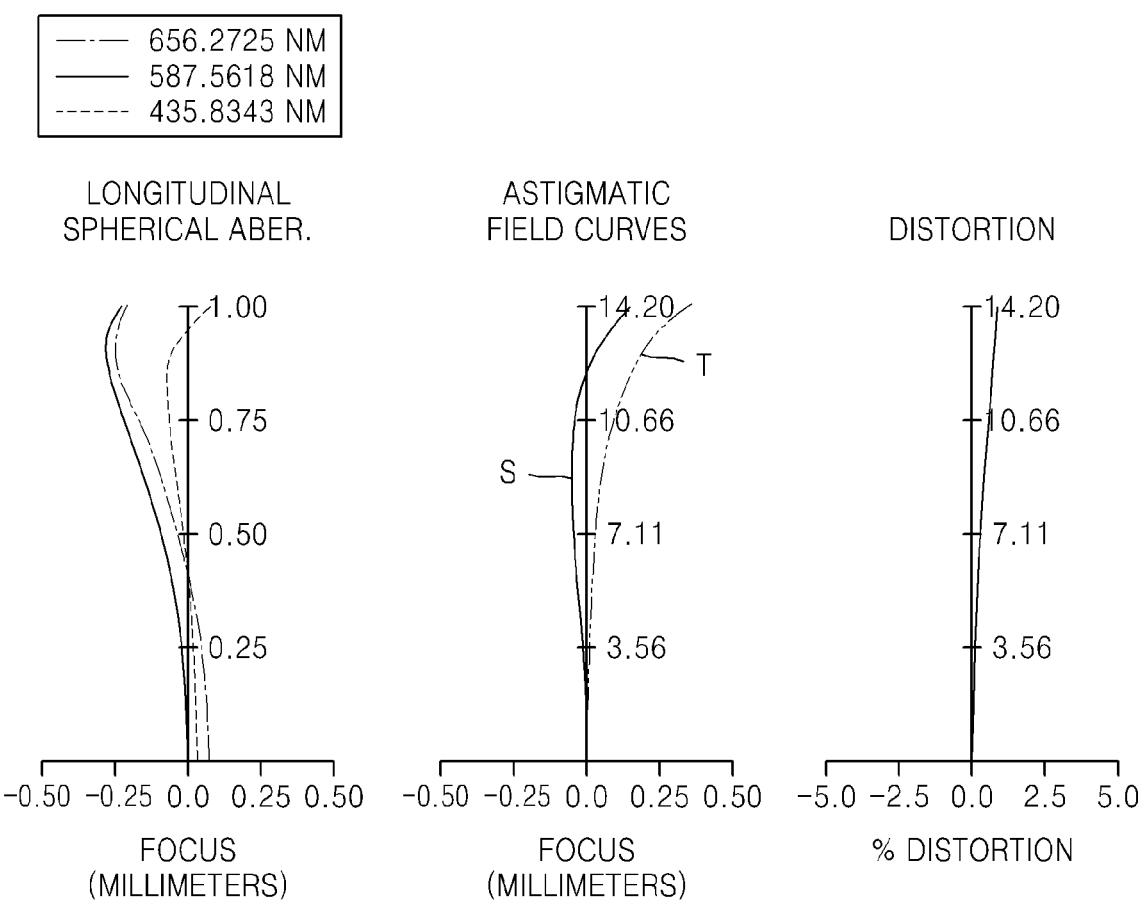

FIGS. 4A, 4B, and 4C are aberration diagrams showing a longitudinal spherical aberration, astigmatic field curvatures, and distortions when the telephoto lens system if focused on the object located at positions Pos1, Pos2, and Pos3 in the telephoto lens system of FIG. 3.

Third Embodiment

FIG. 5 shows optical arrangements in the telephoto system according to another embodiment, when the lens is focused on an object that is far from the lens (i.e., at infinity), and when the lens is focused on an object located close to the lens (i.e., at a minimum focusing distance). The telephoto system includes the first lens group G1 having a positive refractive power, the second lens group G2 having a negative refractive power, and the third lens group G3 having a positive refractive power. The first lens group G1 includes a first lens 113 that is a positive lens, a second lens 123 that is a positive lens, a third lens 133 that is a negative lens, and a fourth lens 143 that is a positive lens. The second lens group G2 includes a fifth lens 213 that is a positive lens and a sixth lens 223 that is a negative lens. The fifth lens 213 and the sixth lens 223 form a cemented lens by bonding to each other. The third lens group G3 includes a seventh lens 313 that is a negative lens, an eighth lens 323 that is a positive lens, a ninth lens 333 that is a positive lens, and a tenth lens 343 that is a negative lens. The seventh lens 313 and the eighth lens 323 form a cemented lens by bonding to each other.

The lens data is as follows.

| EFL = 55.70 BFL = 0.50 Fno. = 1.44 FOW = 28.95° | | | | |
|---|---|---|---|---|
| surface | RDY | THI | Nd | Vd |
| 1 | 197.353 | 5.47 | 1.80420 | 46.5 |
| 2 | −131.514 | 0.10 | | |
| 3 | 38.642 | 5.13 | 1.69680 | 55.5 |
| 4 | 101.515 | 3.76 | | |
| 5 | −84.219 | 1.70 | 1.76182 | 26.6 |
| 6 | 25.468 | 0.11 | | |
| 7 | 25.805 | 8.73 | 1.85135 | 40.1 |
| 8 | −102.730 | D1 | | |
| 9 | 185.666 | 4.99 | 1.84666 | 23.8 |
| 10 | −30.289 | 1.20 | 1.83481 | 42.7 |
| 11 | 27.223 | D2 | | |
| ST | Infinity | 3.44 | | |
| 13 | −25.977 | 4.00 | 1.72825 | 28.3 |
| 14 | 26.385 | 5.48 | 1.88300 | 40.8 |
| 15 | −34.444 | 1.95 | | |
| 16 | 45.552 | 4.72 | 1.83481 | 42.7 |
| 17 | −53.119 | 1.13 | | |
| 18 | −32.934 | 1.40 | 1.63980 | 34.6 |
| 19 | −71583.423 | 19.18 | | |
| 20 | Infinity | 2.80 | 1.51680 | 64.2 (Filter) |
| 21 | Infinity | 0.50 | | |
| 22 | Infinity | 0.00 | | |

TABLE 3

| | Pos1 | Pos2 | Pos3 |
|---|---|---|---|
| Magnification | 0.0000 | 1/30 | 0.153 |
| Object location | INF. | 1690.36 | 360.974 |
| D1 | 2.0 | 3.321 | 8.82 |
| D2 | 11.246 | 9.925 | 4.426 |

Figure 6A:
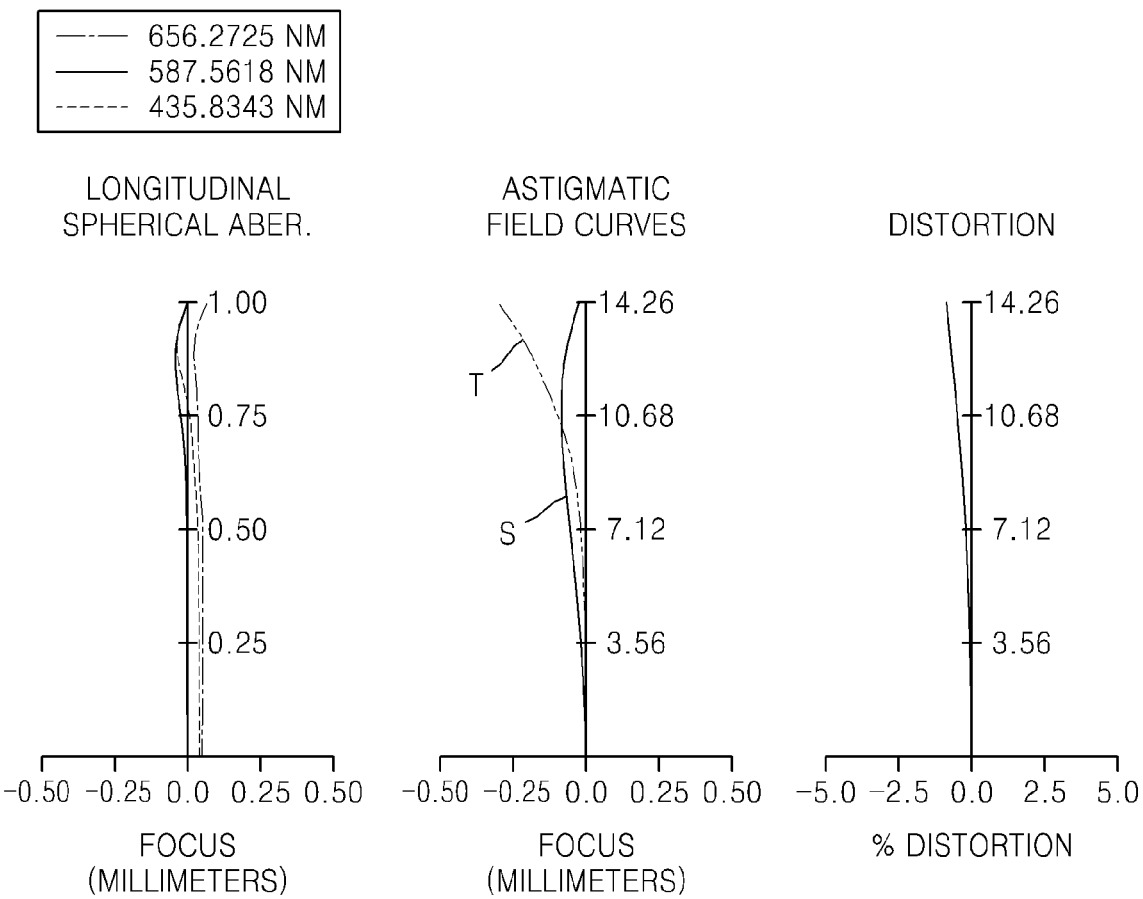
FIGS. 6A, 6B, and 6C are diagrams showing spherical aberration, field curvature, and distortion of the telephoto lens system of FIG. 5 when focused on a object located at an infinite (i.e., far away) location, at a medium location, and at a shortest location.
Figure 6B:
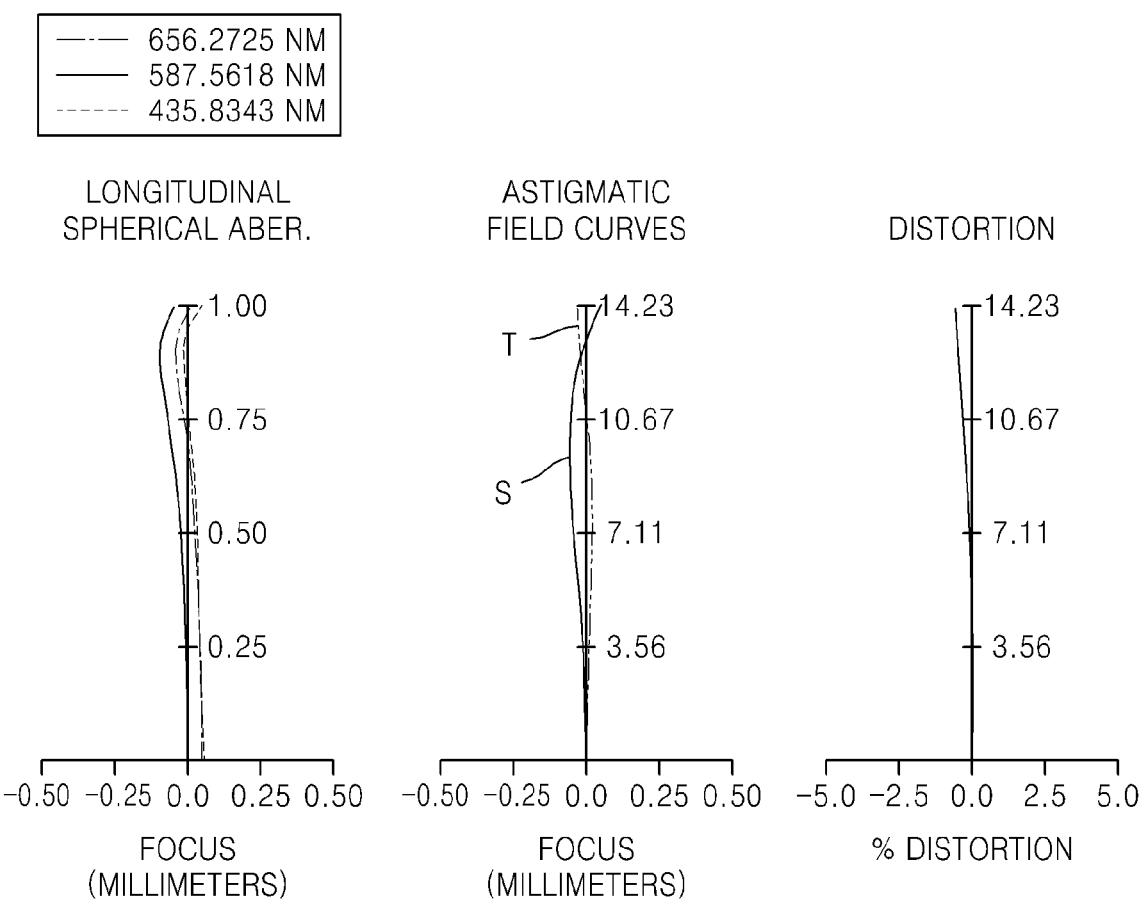
Figure 6C:
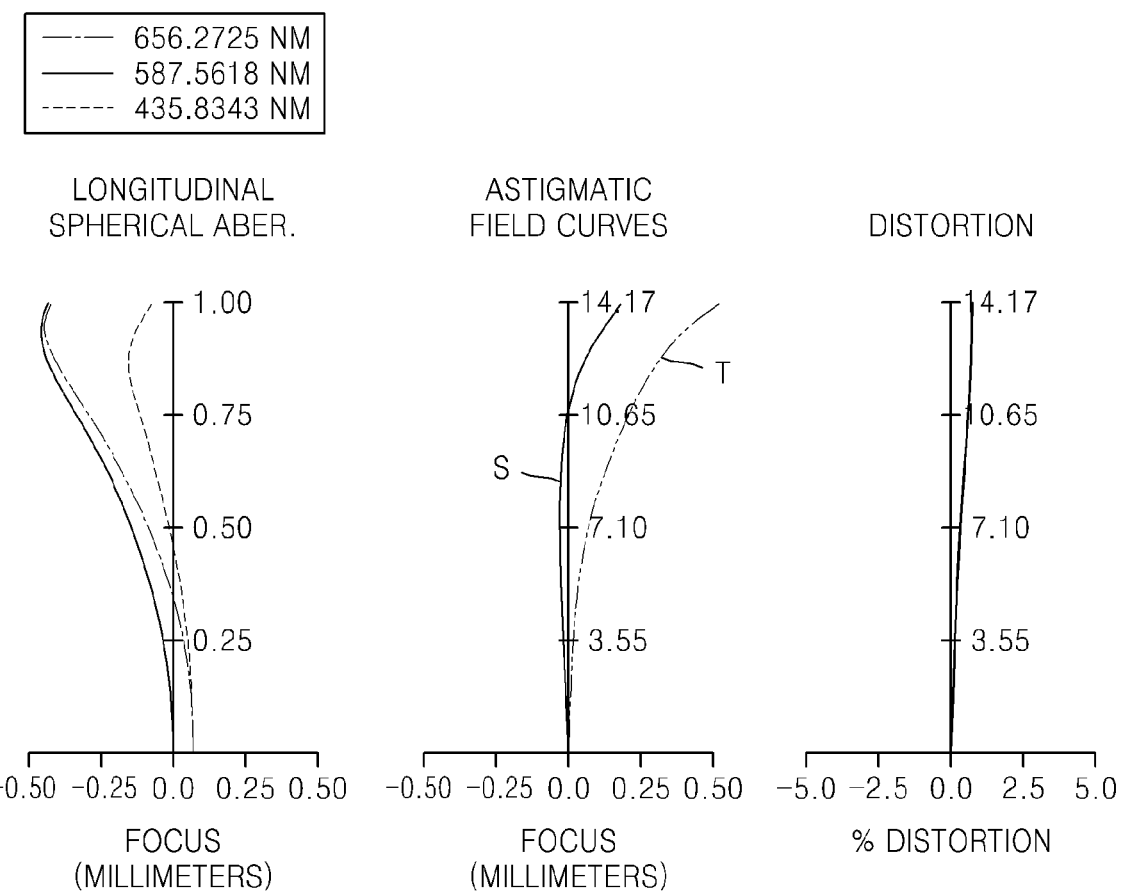

FIGS. 6A, 6B, and 6C are aberration diagrams showing a longitudinal spherical aberration, astigmatic field curvatures, and distortions when telephoto lens system is focused on the object located at positions Pos1, Pos2, and Pos3 in the telephoto lens system of FIG. 5.

Following table shows that the foregoing embodiments satisfy above described inequalities.

TABLE 4

| | First embodiment | Second embodiment | Third embodiment |
|---|---|---|---|
| f/f3n | −0.831 | −0.831 | −1.081 |
| (r3n2 + r3n1)/(r3n2 − r3n1) | 1.026 | 1.000 | 1.001 |
| (r3n1 + r3p)/(r3n1 − r3p) | −2.672 | −3.069 | −4.263 |
| N3n | 1.56732 | 1.60342 | 1.63980 |
| (r1p2 + r1p1)/(r1p2 − r1p1) | −0.286 | −0.205 | −0.2 |

According to the foregoing embodiments, the telephoto lens system having an inner focus type that is suitable for an electronic still camera or a video camera, in particular, a camera having an auto-focus function, and at the same time, having an F number about 1.4 that is bright and a wide-angle, for example, a viewing angle of about 30° may be realized.

While exemplary embodiments have been shown and described, it will be understood by those of ordinary skill in the art that various changes in form and details may be made therein without departing from the spirit and scope defined by the following claims.

What is claimed is:

1. A telephoto lens system comprising:
   a first lens group having a positive refractive power, comprising at least three positive lenses and one negative lens;
   a second lens group having a negative refractive power, and which moves along the optical axis to perform a focusing operation;
   a third lens group having a positive refractive power, comprising a cemented lens in which a negative lens having a concave surface toward the object side and a positive lens having a convex surface toward the image side are bonded to each other, a bi-convex positive lens, and a negative lens having a concave surface toward the object side, wherein the cemented lens, the bi-convex positive lens, and the negative lens are disposed sequentially from the object side toward the image side;
   wherein the first through third lens groups are disposed sequentially from the object side toward the image side.

2. The telephoto lens system of claim 1, wherein the telephoto lens system satisfies the following inequality $-1.2 < f/f3n < -0.7$, where f denotes the overall focal length of the telephoto lens system, and f3n denotes the focal length of the negative lens that is the closest to the image side in the third lens group.

3. The telephoto lens system of claim 1, wherein the telephoto lens system satisfies the following inequality:

$0.6 < (r3n2+r3n1)/(r3n2-r3n1) < 1.4$, where r3n1 and r3n2 respectively denote the radius of curvature of the object side surface and the image side surface of the negative lens that is the closest to the image side in the third lens group.

4. The telephoto lens system of claim 1, wherein the telephoto lens system satisfies the following inequality:

$-6.0 < (r3n1+r3p)/(r3n1-r3p) < -1.5$, where r3n1 denotes the radius of curvature of the object side surface of the negative lens that is the closest to the image in the third lens group, and r3p denotes the radius of curvature of the image side surface of the positive lens that is adjacent to the negative lens closest to the image side in the third lens group.

5. The telephoto lens system of claim 1, wherein the telephoto lens system satisfies the following inequality:

$1.52 < N3n < 1.70$, where N3n denotes the refractive index of the negative lens that is the closest to the image side in the third lens group.

6. The telephoto lens system of claim 1, further comprising an aperture stop disposed on the object side of the third lens group.

7. The telephoto lens group of claim 1, wherein the first lens group comprises a positive lens, a positive lens formed as a meniscus, a bi-concave negative lens, and a positive lens, that are arranged sequentially from the object side to the image side.

8. The telephoto lens system of claim 1, wherein the telephoto lens system satisfies the following inequality:

$-0.4 < (r1p2+r1p1)/(r1p2-r1p1) < -0.1$, where r1p1 and r1p2 respectively denote the radius of curvature of the object side surface and the image side surface of the positive lens that is the closest to the object in the first lens group.

* * * * *